Nov. 10, 1936.         H. GRÜMMER         2,060,304
FILLER
Filed Aug. 25, 1934

INVENTOR
Heinrich Grümmer

Patented Nov. 10, 1936

2,060,304

UNITED STATES PATENT OFFICE 2,060,304

FILLER

Heinrich Grümmer, Rheinhausen-Hochemmerich, Germany

Application August 25, 1934, Serial No. 741,415
In Germany July 19, 1933

1 Claim. (Cl. 152—13)

This invention relates to a filler for automatically sealing punctured pneumatic tires.

There are various kinds of liquid and solid fillers known for this purpose, and one of the latter comprises a plurality of small discs of uniform thickness which are used in connection with a coarse-grained and fine-grained cohesive mineral powder to close the air gaps produced by the discs on account of their uniform thickness and rigidity. It has been found that the use of coarse-grained powder necessarily prevents the discs from lying closely on top of one another and thus interferes with complete sealing.

This drawback is overcome according to the invention by producing a filler consisting of small discs or plates which are shaped like a lens or lentil and have thin and sharp edges. The sealing effect of the discs is thus considerably improved, and it is possible to use only fine-grained powder.

Figure 1:
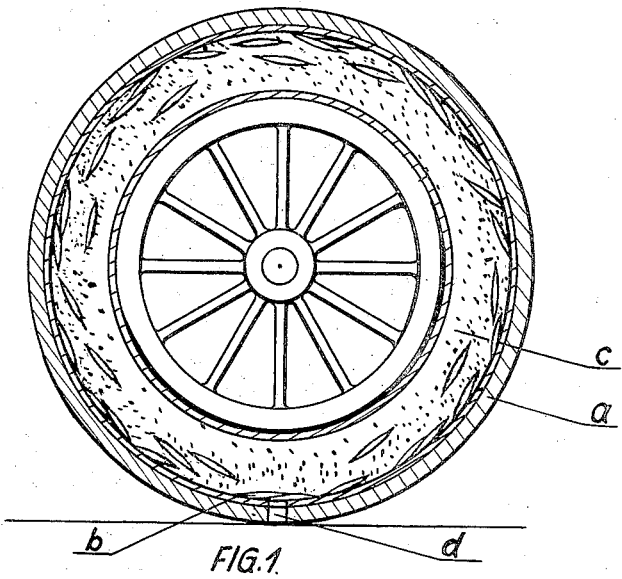
Figure 2:

By way of example, the invention is illustrated in the accompanying drawing, in which Figure 1 is a sectional view showing the position of the fillers within the inner tube of a revolving wheel having a pneumatic tire, and indicating the arrangement of discs over a puncture; Fig. 2 a detail view of a filler element according to the invention.

Figs. 1 and 2 show a filler according to the invention, which consists of the small plates or discs $e$ having the form of a lentil with sharp edges. This form imparts to the discs great elasticity and permits them to lie above the puncture $d$ without forming gaps, so that their sealing effect is considerably improved and the use of coarse-grained powder can be dispensed with.

The discs according to the invention act as follows:

They are placed within the inner tube together with some fine-grained cohesive powder. When a travelling wheel is punctured, air within the tube presses a small amount of powder outside through the hole formed and entrains the nearest disc which is thus placed as sealing element over the hole and held in position by the outward pressure of the air.

I claim:—

A filler for automatically sealing punctured pneumatic tires, comprising a plurality of lens-shaped elastic discs with sharp edges adapted to be drawn into and held in position above a puncture by the outward pressure of the air within the tire.

HEINRICH GRÜMMER.